C. E. NORTH.
MILK CAN.
APPLICATION FILED MAY 27, 1910.
982,013.
Patented Jan. 17, 1911.
2 SHEETS—SHEET 1.
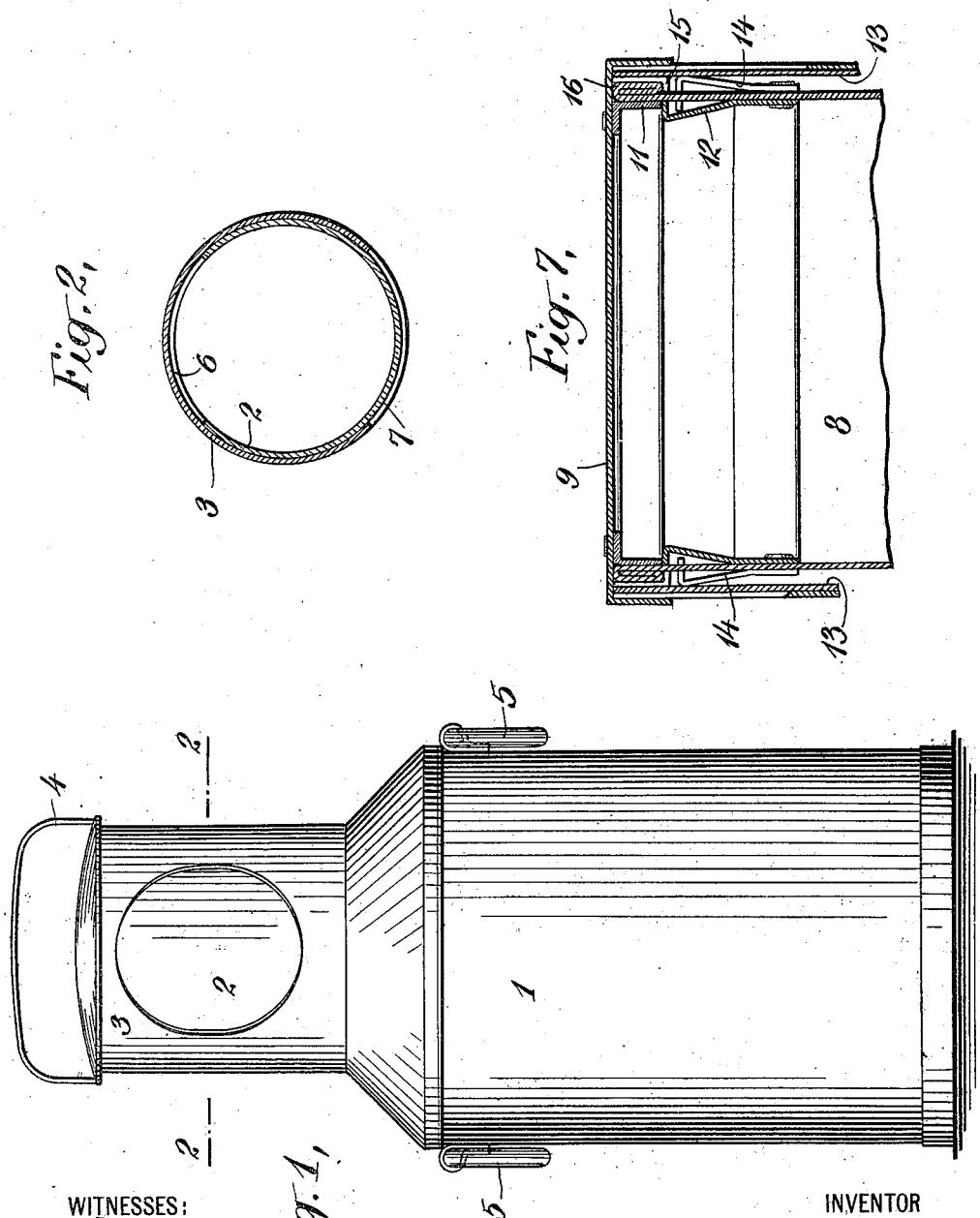
WITNESSES:
INVENTOR
Charles E. North
BY
ATTORNEY C. E. NORTH.
MILK CAN.
APPLICATION FILED MAY 27, 1910.
982,013.
Patented Jan. 17, 1911.
2 SHEETS—SHEET 2.
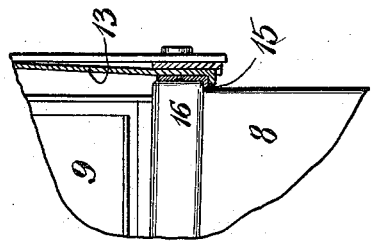
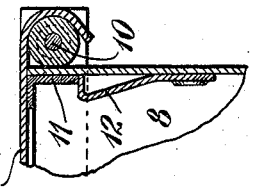
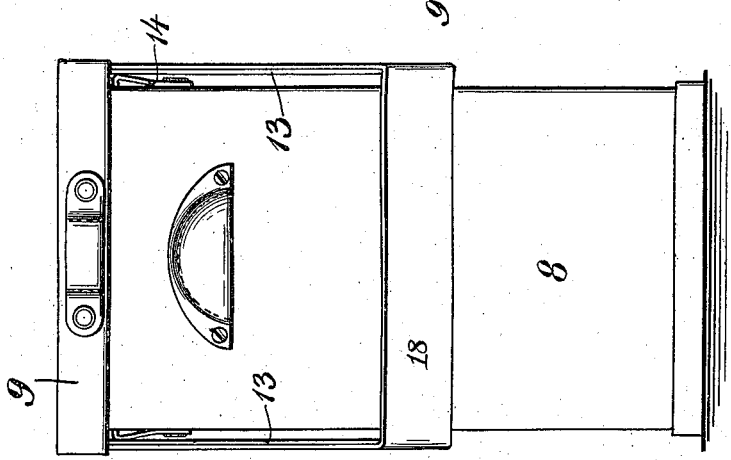
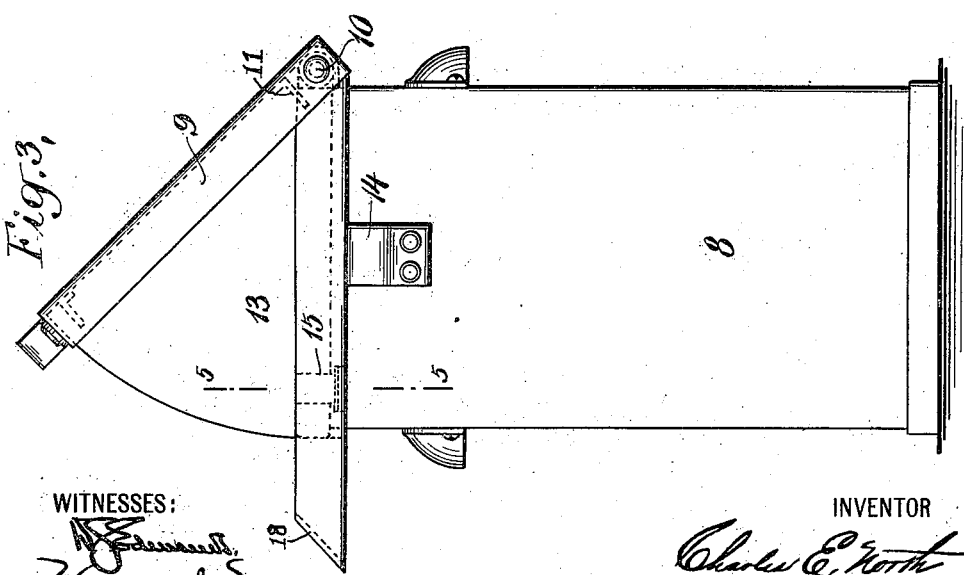
WITNESSES:
INVENTOR
Charles E. North
BY
ATTORNEY

UNITED STATES PATENT OFFICE.

CHARLES E. NORTH, OF MONTCLAIR, NEW JERSEY, ASSIGNOR TO NEW YORK DAIRY DEMONSTRATION COMPANY, OF NEW YORK, N. Y., A CORPORATION OF NEW YORK.

MILK-CAN.

982,013.     Specification of Letters Patent.     Patented Jan. 17, 1911.

Application filed May 27, 1910. Serial No. 563,686.

*To all whom it may concern:*

Be it known that I, CHARLES E. NORTH, a citizen of the United States, and a resident of Montclair, in the county of Essex and State of New Jersey, have invented certain new and useful Improvements in Milk-Cans, of which the following is a specification.

This invention relates to milk-cans and is directed to the provision of a can or container for milk constructed in a novel manner and adapted particularly for use in receiving and transporting milk under conditions which are far more sanitary than those now commonly prevailing.

The invention involves the provision of a can or container which may be used when milking for receiving the milk direct from the cow and which may also be used in transporting the milk, so that but one receptacle is used for the milk up to the time of its delivery to the dealer or consumer.

The invention also involves the provision of a milk-can having a cover thereon which is movable to close or uncover an opening leading to the interior of the can without removing the cover from the can.

Heretofore it has been the common practice to use a pail to receive the milk when milking and a can into which the milk is thereafter poured for transportation. This practice is open to severe criticism, first, because it involves the use of two containers for the milk, either or both of which may have foreign substances therein, and second, because the opening in the pail is of large area and is horizontally disposed so that foreign substances may readily drop through the air into the milk within the can. In the effort to avoid these objectionable characteristics incident to the common method of procedure, it has been proposed to milk directly into the can used in shipping the milk. When this has been done, however, a can has been used the cover of which is removed from the can during milking to provide the opening leading to the interior of the can. This cover, when removed, is laid upon the ground or hung up within the stable during the milking operation, whereupon it is replaced upon the can, and any foreign matter which settles upon the cover during this time when the cover is removed is, of course, taken up by the milk. Furthermore, the opening to the interior of such a can is horizontally disposed so that the possibility of impurities falling within the can is much greater than it would be were the opening of the same size and vertically disposed.

This invention is directed to the provision of a milk-can which is so constructed that the objectionable characteristics above referred to are avoided. It involves the provision of a milk-can having a cover which, without removing it from the can, can be moved to close or uncover an opening leading to the interior of the can to permit of filling the can by milking directly into it. With such a can, but one container is used for receiving and transporting the milk, the can may be opened for filling by milking directly into it without permitting impurities floating in or falling through the air to settle upon the cover and later to get into the milk, and the opening in the can to receive the milk may be substantially vertically disposed so that it is hardly possible for foreign substances to fall into the can. The cover of the can need never be removed unless it is when cleaning or emptying the can, which operations may be facilitated by the complete removal of the cover; but particularly, the cover is not removed from the can from the time the can is cleaned up to the time it is to be emptied.

Various constructions may be employed in a milk-can embodying the characteristics of my invention, and I have shown two such constructions in the accompanying drawings, in which:—

Figure 1 is an elevation of a milk-can, Fig. 2 is a transverse section on line 2—2 of Fig. 1, Fig. 3 is a side view of a modified form of can, Fig. 4 is a front view of the same, Fig. 5 is a sectional detail view on line 5—5 of Fig. 3, and Figs. 6 and 7 are sectional detail views hereinafter referred to.

Referring first to Figs. 1 and 2, a common form of milk-can is shown, having a body 1, contracted neck 3, cover 2 fitting within the neck 3, a handle 4 on the cover 2, and handles 5 on the body 1. The neck 3 is provided with an opening 7 of substantial size and preferably round. The side wall of the cover 2 is provided with a similar opening 6 corresponding in size and shape to the opening 7. The cover 2 turns readily upon the neck 3 so that the opening 6 can be brought over or carried away from the opening 7 to close or open a passage leading to the interior of the can for milking directly into the can. With such a can, the cover 2 need never be removed from the can from the time the can is cleaned until the milk has been or is about to be removed from the can. For milking, it is only necessary to turn the cover until the openings 6 and 7 are in alinement, whereupon milking directly into the can is permitted and the opening thus provided is in a vertically disposed wall so that there is little danger of foreign matter entering the can. After milking, the cover is turned to carry opening 6 away from opening 7 and the can and milk are ready for shipment.

The construction illustrated in Figs. 3 to 7, though different from that shown in Figs. 1 and 2, embodies the same characteristics. The body 8 of the can is rectangular in cross-section and the cover 9 is hinged thereto at one edge by means of the hinge-rod 10. The cover 9 is provided with a flange 11 adapted to fit within the body 8, and on the interior of the body may be secured a strip 12 shaped as shown, on which the edge of the flange 11 rests when the cover 9 is down. The cover is provided with side-flaps 13, such that when the cover is raised as in Fig. 3, the only opening provided will be that at the front of the can for milking directly into the can. Also the cover is provided with a handle 18 at the edge opposite the hinge, the ends of this handle being secured to the flaps 13 at the lower edges of the latter. In order to support the cover in the raised position, spring clips 14 are secured to the sides of the body, these being adapted to move outwardly under the edges of the side-flaps 13 to support the cover as in Fig. 3. Excessive movement of the cover is precluded by a stop 15 secured to one of the side-flaps 13 and having a lip adapted to coact with the reinforced upper edge 16 of the body 8. With this form of can, it will be seen that the cover 9 may, without removing it from the body, be moved to a position for providing an opening leading to the interior of the can to permit of milking directly into the can and for closing that opening to permit of transporting the milk in the same receptacle as that used in milking; and furthermore, the opening provided by the movement of the cover is in a plane which is substantially vertical, so that there is practically no danger of impurities ing through the air to the interior of the can.

Having now described my invention, what I claim as new and desire to secure by Letters Patent is as follows:—

1. A milk-can comprising a body, a cover therefor, and means for supporting said cover on the can in position to provide an opening leading to the interior of the can and lying in a substantially vertical plane, and in position to close said opening, substantially as set forth.

2. A milk-can comprising a body, an integral contracted neck thereon having an opening in its wall, and a cover fitting over said neck, movable thereon and provided with an opening in the side wall thereof adapted to aline with said opening in the neck to permit of milking directly into the can or to be moved away from said opening in the neck when transporting the milk, substantially as set forth.

3. A milk-can having a body and a cover mounted upon the body and adapted to be supported in a position providing an opening leading to the interior of the can to permit of milking directly into the can which opening is disposed in a substantially vertical plane when the can is in milking position, said cover being also movable into position to close said opening when transporting the milk in the can, substantially as set forth.

4. A milk-can comprising a body, a contracted neck and a cover adapted to fit over said neck to close the can when transporting milk therein, said cover being movable to and adapted to be supported in a position providing an opening leading to the interior of the can to permit of milking directly into the can and disposed in a substantially vertical plane when the can is in milking position, substantially as set forth.

This specification signed and witnessed this 21 day of May, 1910.

CHARLES E. NORTH.

Witnesses:
HARRY B. WINTERS,
ETHEL SMYTH.